United States Patent [19]
Ishiguro et al.

[11] Patent Number: 5,949,375
[45] Date of Patent: Sep. 7, 1999

[54] METHOD OF AND APPARATUS FOR CALCULATING POSITION OF MOVABLE BODY IN NAVIGATION SYSTEM, METHOD OF AND APPARATUS FOR CORRECTING THE POSITION, AND PROGRAM STORAGE DEVICE READABLE BY THE APPARATUS

[75] Inventors: Motoki Ishiguro; Shingo Kuwahara, both of Kawagoe, Japan

[73] Assignee: Pioneer Electronic Corporation, Tokyo-to, Japan

[21] Appl. No.: 08/841,102

[22] Filed: Apr. 30, 1997

[30] Foreign Application Priority Data

May 2, 1996 [JP] Japan ..................................... 8-111706

[51] Int. Cl.[6] ...................................................... G01S 3/02
[52] U.S. Cl. ........................................... 342/457; 701/216
[58] Field of Search ............................. 342/457; 701/207, 701/216

[56] References Cited

U.S. PATENT DOCUMENTS 4,903,212  2/1990  Yokouchi et al. .

FOREIGN PATENT DOCUMENTS

| 0 522 862 | 1/1993 | European Pat. Off. . |
| 0 565 191 | 10/1993 | European Pat. Off. . |
| 0 598 518 | 5/1994 | European Pat. Off. . |
| 0 699 894 | 3/1996 | European Pat. Off. . |
| 43 32 945 | 3/1995 | Germany . |
| 62-298717 | 12/1987 | Japan . |
| 4-353783 | 12/1992 | Japan . |
| WO 97/00424 | 1/1997 | WIPO . |

OTHER PUBLICATIONS

Wei–Wen Kao, "Integration of GPS and dead–reckoning navigation systems", pp. 635–643, Institute of Electrical and Electronics Engineers, vol. 2, Oct. 20, 1991.

*Primary Examiner*—Mark Hellner
*Attorney, Agent, or Firm*—Young & Thompson

[57] ABSTRACT

A method of calculating a present position of a movable body for use in a navigation system, is provided with the processes of: measuring an electric-wave-based measurement position which is a position of the movable body measured on the basis of electric waves for positional measurement, which are transmitted from satellites accompanied by time data indicating an electric-wave-based measurement time which is a time when measuring the electric-wave-based measurement position, at the electric-wave-based measurement time; measuring a self-sustained measurement position which is a position of the movable body measured on the basis of data from self-sustained type sensors built in the movable body; calculating a time difference between the electric-wave-based measurement time and a time when measuring the self-sustained measurement position; correcting the electric-wave-based measurement position on the basis of the calculated time difference; and calculating the present position of the movable body on the basis of the corrected electric-wave-based measurement position and the self-sustained measurement position.

15 Claims, 6 Drawing Sheets

$D_1 \sim D_3$: DISTANCE DATA

METHOD OF AND APPARATUS FOR CALCULATING POSITION OF MOVABLE BODY IN NAVIGATION SYSTEM, METHOD OF AND APPARATUS FOR CORRECTING THE POSITION, AND PROGRAM STORAGE DEVICE READABLE BY THE APPARATUS

BACKGROUND OF THE INVENTION

1. Field of the Invention

The present invention relates to a method of and apparatus for calculating a present position of a movable body, and a method of and apparatus for correcting the calculated present position of the movable body in a so-called navigation system, which displays the present position of the movable body on the basis of the position measured by use of measurement electric waves from satellites dedicated for positional measurement, or the position measured in a self-sustained manner by use of self-sustained or built-in type sensors.

2. Description of the Related Art

There is a so-called navigation apparatus, which displays a map including a position where a movable body in various kinds such as an automobile, an airplane, a ship etc., is currently located, and further superimposes a position mark indicating a position of the movable body at the currently located position on the displayed map, so as to perform a route guidance or navigation to the destination on the basis of the display. Among the navigation apparatuses, as on-vehicle navigation apparatuses which are mounted on vehicles or automobiles, there is a self-sustained or built-in type navigation apparatus and a GPS (Global Positioning System) type navigation apparatus as rough categories.

The former is a navigation apparatus, which obtains a moving direction and a moving distance of the movable body by use of self-sustained type or built-in type sensors such as a speed sensor, an angular speed sensor etc. equipped in or built in the pertinent vehicle, sequentially adds them with respect to a standard position so as to calculate the present position, and displays the present position mark and the corresponding map on the display picture plane on the basis of the calculated present position.

On the other hand, the latter is a navigation apparatus, which receives measurement electric waves from a plurality of GPS satellites launched in the space by a GPS receiver, calculates the present position of the movable body by means of a 3-dimensional measuring method or a 2-dimensional measuring method on the basis of the electric wave reception results, and displays the present position mark and the corresponding map on the display picture plane on the basis of the calculated present position.

Further, there is an on-vehicle navigation apparatus of a so-called hybrid type provided with both functions of the above described self-sustained type and GPS type.

According to each of the above explained navigation apparatuses, since the user (e.g. the driver) can grasp the present position of the self vehicle and the map in the vicinity of the present position in association with each other, it is possible to reach a destination without losing his or her way even in an area where the user has never experienced.

However, in the on-vehicle navigation apparatus especially in the above mentioned hybrid type, there is a problem that an accurate determination of the present position and the display thereof are inhibited due to various factors as explained below. Each concrete problem will be explained hereinbelow in detail.

Initially, a first problem is explained.

In general, the measurement electric wave from a satellite dedicated for positional measurement is transmitted such that time data indicating time is superimposed thereon. A GPS receiver in the on-vehicle navigation system of hybrid type outputs time information indicating the time at receiving the measurement electric wave, on the basis of the superimposed time data, together with present position information indicating a present position measured on the basis of the received measurement electric waves. Therefore, a CPU used in the on-vehicle navigation system of hybrid type is adapted to calculate the present position by synthesizing the present position information accompanied with the outputted time information based on the measurement electric wave, and the present position information calculated by the self-sustained type sensors. At this time of synthesizing, in the above mentioned on-vehicle navigation system of hybrid type, the time axis for the present position information, which is accompanied by the time information outputted on the basis of the measurement electric waves, and the time axis for the present position information calculated by the self-sustained type sensors are not synchronized with each other. Thus, there is a first problem that, in case that it is attempted to correct the present position information, which is calculated on the basis of the self-sustained type sensors, by use of the present position information, which is calculated on the basis of the measurement electric waves, it is difficult to correct it effectively due to a possible shift between these time axes of these present position informations.

Namely, in the above mentioned positional measurement based on the measurement electric waves, it is practically impossible to receive the measurement electric waves regularly by a constant cycle due to factors such as the position of the pertinent vehicle on the earth, the number of the GPS satellites able to receive the measurement electric waves and so on. More concretely, even if the measurement calculation by use of the measurement electric waves is supposed to be performed once every second, the calculation cycle may be changed to 1.5 seconds, for example. Further, since it takes about 1 to 2 seconds to actually finish calculating the measurement result (i.e. the present position information) after receiving the measurement electric waves, the calculated measurement result actually indicates the position of the movable body which is about 1 to 2 seconds before the present time.

In contrast to this, the positional measurement of the present position based on the self-sustained type sensors is almost accurately performed once every second, and the time required for completing the measurement calculation is short enough to neglect it in practice.

Therefore, the time axis for the present position information, which is outputted on the basis of the measurement electric waves, and the time axis for the present position information calculated by the self-sustained type sensors are not inevitably synchronized with each other. Consequently, the correction or the like for the present position information based on the self-sustained type sensors by use of the present position information based on the measurement electric waves, cannot be effectively applied due to the shift of these time axes.

Nextly, a second problem is explained.

As explained above, although the self-sustained type sensors output the present position information almost accurately once every second, there may be such a case that all of the present position information is not regularly inputted to the CPU. Thus, particularly, the distance information in the present position information based on the self-sustained type sensors becomes inaccurate, which is the second problem.

This point is explained in more detail with reference to FIG. 6A. In case that all of the present position information is regularly inputted from the self-sustained type sensors to the CPU, the distance information is regularly and sequentially added as shown in the upper half of FIG. 6A, so that the accurate distance information can be obtained. However, if a second distance data D2 is dropped out (not measured or inputted), although the self vehicle actually advances for a distance D as $$D=\Delta d1+\Delta d2+\Delta d3,$$

the self-vehicle seems to advance, on the calculation, for a distance
D' as $$D=\Delta d1+\Delta d3.$$

Accordingly, a distance error is generated. As a case where this distance information is dropped out and is not taken into the CPU, for example, there are a case where the distance data itself is destroyed by a physical noise generated on a communication line from the self-sustained type sensors to the CPU, a case where the distance data cannot be taken into the CPU for a while since the CPU performs a process for other information having a higher priority such as traffic jam information from the VICS (Vehicle Information and Communication System), which has been just put into practice, and so on. Then, the distance error becomes large as the case where the distance data cannot be taken happens more frequently, so that the present position cannot be accurately measured or displayed.

Finally, a third problem is explained with reference to FIG. 6B.

In general, in the on-vehicle navigation system, even if the self vehicle is actually traveling on a road for example, there may be such a case that the calculated present position indicates a position which is not on the road due to the measurement error or the like. In this case, a so-called map matching process is performed to correct the display position of the present position onto a position on a road, which is the closest to the measured present position $P_3$ obtained by calculating the moving vector V with respect to the previous display position of the present position as a standard, and displays the present position on the correct displayed position (i.e. a presently map matched position $P_2$). In the above mentioned on-vehicle navigation system, after calculating the present position and then performing the map matching process, the position after the map matching process is displayed as the present position.

However, in general, it takes a long processing time period to perform this map matching process. Thus, as the movable body advances during this processing time period, although the self-vehicle is actually positioned at a true present position C, the position displayed as the present position is the presently map matched position $P_2$. Consequently, the error is certainly included in the displayed present position by the amount corresponding to the distance between the true present position C and the presently map matched position $P_2$. In this way, the present position cannot be accurately displayed.

SUMMARY OF THE INVENTION

It is therefore an object of the present invention to provide a method of and apparatus for calculating a present position of a movable body, and a method of and apparatus for correcting the calculated present position in a navigation system of hybrid type or the like, which can obtain the present position more accurately with respect to the actual present position so as to accurately display the present position.

The above object of the present invention can be achieved by a first method of calculating a present position of a movable body, such as a vehicle etc., for use in a navigation system for navigating the movable body. The first method is provided with: an electric-wave-based measurement process of measuring an electric-wave-based measurement position which is a position of the movable body measured on the basis of electric waves for positional measurement, which are transmitted from satellites, such as GPS satellites etc., accompanied by time data indicating an electric-wave-based measurement time which is a time when measuring the electric-wave-based measurement position, at the electric-wave-based measurement time; a self-sustained measurement process of measuring a self-sustained measurement position which is a position of the movable body measured on the basis of data from self-sustained type sensors, such as a travel distance sensor etc., built in the movable body; a time difference calculation process of calculating a time difference between the electric-wave-based measurement time and a time when measuring the self-sustained measurement position by the self-sustained measurement process; a correction process of correcting the electric-wave-based measurement position on the basis of the calculated time difference; and a present position calculation process of calculating the present position of the movable body on the basis of the corrected electric-wave-based measurement position and the self-sustained measurement position.

According to the first method of the present invention, at first, an electric-wave-based measurement position of the movable body is measured on the basis of the electric waves at the electric-wave-based measurement time, by the electric-wave-based measurement process. On the other hand, a self-sustained measurement position of the movable body is measured on the basis of the data from the self-sustained type sensors, such as a travel distance sensor, an angular speed sensor etc., without using the electric waves, by the self-sustained measurement process. Then, a time difference between the electric-wave-based measurement time and the time when measuring the self-sustained measurement position by the self-sustained measurement process is calculated by the time difference calculation process. Then, the electric-wave-based measurement position is corrected on the basis of the calculated time difference, by the correction process. Finally, the present position of the movable body is calculated on the basis of the corrected electric-wave-based measurement position and the self-sustained measurement position, by the present position calculation process.

Accordingly, even in case that a significant time difference exists between the electric-wave-based measurement time and the time when measuring the self-sustained measurement position by the self-sustained measurement process, the present position of the movable body is calculated by correcting this time difference. Therefore, an accurate present position of the movable body can be calculated in consideration of the time difference.

Thus, it is possible to accurately display the present position of the movable body.

In one aspect of the first method of the present invention, the correction process corrects the electric-wave-based measurement position by superimposing a moving distance of the movable body, which corresponds to the calculated time difference and is calculated on the basis of the data from the self-sustained type sensors, onto the electric-wave-based measurement position, so as to calculate the corrected electric-wave-based measurement position.

According to this aspect of the first method, by the correction process, the corrected electric-wave-based measurement position is calculated in such a manner that the electric-wave-based measurement position is corrected by superimposing a moving distance of the movable body, which corresponds to the calculated time difference and is calculated on the basis of the data from the self-sustained type sensors, onto the electric-wave-based measurement position. Accordingly, it is possible to calculate the accurate present position by a rather simple process.

The above object of the present invention can be also achieved by a second method of calculating a present position of a movable body, such as a vehicle etc., for use in a navigation system having a distance sensor for navigating the movable body, the distance sensor cyclically outputting distance data, which indicates a moving distance of the movable body measured in a self-sustained way once every predetermined cycle and includes an identifier, such as identification data etc., for identifying the distance data at each cycle. The second method is provided with: a distance measurement process of outputting the distance data one after another in connection with a movement of the movable body; a drop out detection process of detecting a drop out of the distance data on the basis of the identifier included in the outputted distance data; a pseudo distance data generation process of generating pseudo distance data corresponding to the dropped out distance data on the basis of the distance data outputted before the dropped out distance data and the distance data outputted after the dropped out distance data, when the drop out is detected by the drop out detection process; a moving distance calculation process of calculating the moving distance by adding the generated pseudo distance data onto the distance data outputted after the dropped out distance data, when the drop out is detected by the drop out detection process; and a present position calculation process of calculating the present position of the movable body on the basis of the calculated moving distance.

According to the second method of the present invention, distance data is outputted one after another in connection with a movement of the movable body, by the distance measurement process. At this time, a drop out of the distance data is detected on the basis of the identifier included in the outputted distance data, by the drop out detection process. Then, when the drop out is detected, pseudo distance data corresponding to the dropped out distance data is generated on the basis of the distance data outputted before the dropped out distance data and the distance data outputted after the dropped out distance data, by the pseudo distance data generation process. When the drop out is detected by the drop out detection process, the moving distance is calculated by adding the generated pseudo distance data onto the distance data outputted after the dropped out distance data, by the moving distance calculation process. Finally, the present position of the movable body is calculated on the basis of the calculated moving distance, by the present position calculation process.

Accordingly, even in case that the distance data to be continuously outputted is intermittently dropped out, the dropped out distance data is approximately interpolated by the pseudo distance data, so that the moving distance is calculated. Therefore, by use of this calculated moving distance, an accurate present position of the movable body can be calculated.

Thus, it is possible to accurately display the present position of the movable body.

The above object of the present invention can be also achieved by a third method of correcting a present position of a movable body, such as a vehicle etc., onto a position on a route, where the movable body is supposed to exist, corresponding to the present position for use in a navigation system for navigating the movable body. The third method is provided with: a vector generation process of generating a moving vector corresponding to a movement of the movable body with respect to a previously corrected position of the movable body as a start point of the moving vector; a display process of displaying a position of an end point of the generated moving vector as the present position of the movable body; and a correct process of correcting the position of the end point to a position on the route corresponding to the position of the end point after displaying the position of the end point by the display process.

According to the third method of the present invention, a moving vector corresponding to a movement of the movable body with respect to a previously corrected position of the movable body as a start point of the moving vector is generated by the vector generation process. Then, a position of an end point of the generated moving vector is displayed as the present position of the movable body, by the display process. After displaying the position of the end point by the display process, the position of the end point is corrected to a position on the route corresponding to the position of the end point, by the correct process.

Accordingly, since the position of the end point of the moving vector is corrected onto the route after displaying the position of the end point as the present position, the present position can be displayed without including the error corresponding to the time required for correcting the position onto the route, in contrast to a case where the corrected position is displayed after correcting the position of the end point of the moving vector onto the route.

Thus, it is possible to accurately display the present position of the movable body.

In one aspect of the third method of the present invention, the third method is further provided with a re-display process of displaying the corrected position on the route as the present position of the movable body.

According to this aspect of the third method, after the position of the end point is corrected onto the route by the correct process, the corrected position on the route is displayed as the present position of the movable body, by the re-display process. Therefore, it is possible to accurately display the present position of the movable body on the route.

The above object of the present invention can be also achieved by a first apparatus for calculating a present position of a movable body, such as a vehicle etc., for use in a navigation system for navigating the movable body. The first apparatus is provided with: an electric-wave-based measurement device, such as a GPS receiver etc., for measuring an electric-wave-based measurement position which is a position of the movable body measured on the basis of electric waves for positional measurement, which are transmitted from satellites, such as GPS satellites etc., accompanied by time data indicating an electric-wave-based measurement time which is a time when measuring the electric-wave-based measurement position, at the electric-wavebased measurement time; a self-sustained measurement device, such as a CPU etc., for measuring a self-sustained measurement position which is a position of the movable body measured on the basis of data from self-sustained type sensors, such as a travel distance sensor etc., built in the movable body; a time difference calculation device, such as a CPU etc., for calculating a time difference between the electric-wave-based measurement time and a time when measuring the self-sustained measurement position by the self-sustained measurement device; a correction device, such as a CPU etc., for correcting the electric-wave-based measurement position on the basis of the calculated time difference; and a present position calculation device, such as a CPU etc., for calculating the present position of the movable body on the basis of the corrected electric-wave-based measurement position and the self-sustained measurement position.

According to the first apparatus of the present invention, at first, an electric-wave-based measurement position of the movable body is measured on the basis of the electric waves at the electric-wave-based measurement time, by the electric-wave-based measurement device. On the other hand, a self-sustained measurement position of the movable body is measured on the basis of the data from the self-sustained type sensors, such as a travel distance sensor, an angular speed sensor etc., without using the electric waves, by the self-sustained measurement device. Then, a time difference between the electric-wave-based measurement time and the time when measuring the self-sustained measurement position by the self-sustained measurement device is calculated by the time difference calculation device. Then, the electric-wave-based measurement position is corrected on the basis of the calculated time difference, by the correction device. Finally, the present position of the movable body is calculated on the basis of the corrected electric-wave-based measurement position and the self-sustained measurement position, by the present position calculation device.

Accordingly, even in case that a significant time difference exists between the electric-wave-based measurement time and the time when measuring the self-sustained measurement position by the self-sustained measurement device, the present position of the movable body is calculated by correcting this time difference. Therefore, an accurate present position of the movable body can be calculated in consideration of the time difference.

Thus, it is possible to accurately display the present position of the movable body.

In one aspect of the first apparatus of the present invention, the correction device corrects the electric-wave-based measurement position by superimposing a moving distance of the movable body, which corresponds to the calculated time difference and is calculated on the basis of the data from the self-sustained type sensors, onto the electric-wave-based measurement position, so as to calculate the Ad corrected electric-wave-based measurement position.

According to this aspect of the first apparatus, by the correction device, the corrected electric-wave-based measurement position is calculated in such a manner that the electric-wave-based .measurement position is corrected by superimposing a moving distance of the movable body, which corresponds to the calculated time difference and is calculated on the basis of the data from the self-sustained type sensors, onto the electric-wave-based measurement position. Accordingly, it is possible to calculate the accurate present position by a rather simple device.

The above object of the present invention can be also achieved by a second apparatus for calculating a present position of a movable body, such as a vehicle etc., for use in a navigation system having a distance sensor for navigating the movable body, the distance sensor cyclically outputting distance data, which indicates a moving distance of the movable body measured in a self-sustained way once every predetermined cycle and includes an identifier, such as identification data etc., for identifying the distance data at each cycle. The second apparatus is provided with: a distance measurement device for outputting the distance data one after another in connection with a movement of the movable body; a drop out detection device, such as a CPU etc., for detecting a drop out of the distance data on the basis of the identifier included in the outputted distance data; a pseudo distance data generation device, such as a CPU etc., for generating pseudo distance data corresponding to the dropped out distance data on the basis of the distance data outputted before the dropped out distance data and the distance data outputted after the dropped out distance data, when the drop out is detected by the drop out detection device; a moving distance calculation device, such as a CPU etc., for calculating the moving distance by adding the generated pseudo distance data onto the distance data outputted after the dropped out distance data, when the drop out is detected by the drop out detection device; and a present position calculation device, such as a CPU etc., for calculating the present position of the movable body on the basis of the calculated moving distance.

According to the second apparatus of the present invention, distance data is outputted one after another in connection with a movement of the movable body, by the distance measurement device. At this time, a drop out of the distance data is detected on the basis of the identifier included in the outputted distance data, by the drop out detection device. Then, when the drop out is detected, pseudo distance data corresponding to the dropped out distance data is generated on the basis of the distance data outputted before the dropped out distance data and the distance data outputted after the dropped out distance data, by the pseudo distance data generation device. When the drop out is detected by the drop out detection device, the moving distance is calculated by adding the generated pseudo distance data onto the distance data outputted after the dropped out distance data, by the moving distance calculation device. Finally, the present position of the movable body is calculated on the basis of the calculated moving distance, by the present position calculation device.

Accordingly, even in case that the distance data to be continuously outputted is intermittently dropped out, the dropped out distance data is approximately interpolated by the pseudo distance data, so that the moving distance is calculated. Therefore, by use of this calculated moving distance, an accurate present position of the movable body can be calculated.

Thus, it is possible to accurately display the present position of the movable body.

The above object of the present invention can be also achieved by a third apparatus for correcting a present position of a movable body, such as a vehicle etc., onto a position on a route, where the movable body is supposed to exist, corresponding to the present position for use in a navigation system for navigating the movable body. The third apparatus is provided with: a vector generation device, such as a CPU etc., for generating a moving vector corresponding to a movement of the movable body with respect to a previously corrected position of the movable body as a start point of the moving vector; a display device, such as a display etc., for displaying a position of an end point of the generated moving vector as the present position of the movable body; and a correct device, such as a CPU etc., for correcting the position of the end point to a position on the route corresponding to the position of the end point after displaying the position of the end point by the display device.

According to the third apparatus of the present invention, a moving vector corresponding to a movement of the movable body with respect to a previously corrected position of the movable body as a start point of the moving vector is generated by the vector generation device. Then, a position of an end point of the generated moving vector is displayed as the present position of the movable body, by the display device. After displaying the position of the end point by the display device, the position of the end point is corrected to a position on the route corresponding to the position of the end point, by the correct device.

Accordingly, since the position of the end point of the moving vector is corrected onto the route after displaying the position of the end point as the present position, the present position can be displayed without including the error corresponding to the time required for correcting the position onto the route, in contrast to a case where the corrected position is displayed after correcting the position of the end point of the moving vector onto the route.

Thus, it is possible to accurately display the present position of the movable body.

In one aspect of the third apparatus of the present invention, the display device displays the corrected position on the route as the present position of the movable body.

According to this aspect of the third apparatus, after the position of the end point is corrected onto the route by the correct device, the corrected position on the route is displayed as the present position of the movable body, by the display device. Therefore, it is possible to accurately display the present position of the movable body on the route.

The above object of the present invention can be also achieved by a first program storage device readable by an apparatus for calculating a present position of a movable body, such as a vehicle etc., for use in a navigation system for navigating the movable body, tangibly embodying a program of instructions executable by the apparatus to perform method processes for calculating the present position of the movable body. The method processes are provided with: an electric-wave-based measurement process of measuring an electric-wave-based measurement position which is a position of the movable body measured on the basis of electric waves for positional measurement, which are transmitted from satellites, such as GPS satellites etc., accompanied by time data indicating an electric-wave-based measurement time which is a time when measuring the electric-wave-based measurement position, at the electric-wave-based measurement time; a self-sustained measurement process of measuring a self-sustained measurement position which is a position of the movable body measured on the basis of data from self-sustained type sensors, such as a travel distance sensor etc., built in the movable body; a time difference calculation process of calculating a time difference between the electric-wave-based measurement time and a time when measuring the self-sustained measurement position by the self-sustained measurement process; a correction process of correcting the electric-wave-based measurement position on the basis of the calculated time difference; and a present position calculation process of calculating the present position of the movable body on the basis of the corrected electric-wave-based measurement position and the self-sustained measurement position.

According to the first program storage device, such as a CD-ROM, a ROM, a DVD (Digital Video or Versatile Disk), a floppy disk or the like, of the present invention, the above described first method of the present invention can be performed as the present position calculating apparatus reads and executes the program of instructions.

In one aspect of the first program storage device of the present invention, the correction process corrects the electric-wave-based measurement position by superimposing a moving distance of the movable body, which corresponds to the calculated time difference and is calculated on the basis of the data from the self-sustained type sensors, onto the electric-wave-based measurement position, so as to calculate the corrected electric-wave-based measurement position.

According to this aspect of the first program storage device, the above described one aspect of the first method can be performed as the present position calculating apparatus reads and executes the program of instructions.

The above object of the present invention can be also achieved by a second program storage device readable by an apparatus for calculating a present position of a movable body, such as a vehicle etc., for use in a navigation system having a distance sensor for navigating the movable body, the distance sensor cyclically outputting distance data, which indicates a moving distance of the movable body measured in a self-sustained way once every predetermined cycle and includes an identifier, such as identification data etc., for identifying the distance data at each cycle, tangibly embodying a program of instructions executable by the apparatus to perform method processes for calculating the present position of the movable body. The method processes are provided with: a distance measurement process of outputting the distance data one after another in connection with a movement of the movable body; a drop out detection process of detecting a drop out of the distance data on the basis of the identifier included in the outputted distance data; a pseudo distance data generation process of generating pseudo distance data corresponding to the dropped out distance data on the basis of the distance data outputted before the dropped out distance data and the distance data outputted after the dropped out distance data, when the drop out is detected by the drop out detection process; a moving distance calculation process of calculating the moving distance by adding the generated pseudo distance data onto the distance data outputted after the dropped out distance data, when the drop out is detected by the drop out detection process; and a present position calculation process of calculating the present position of the movable body on the basis of the calculated moving distance.

According to the second program storage device, such as a CD-ROM, a RON, a DVD, a floppy disk or the like, of the present invention, the above described second method of the present invention can be performed as the present position calculating apparatus reads and executes the program of instructions.

The above object of the present invention can be also achieved by a third program storage device readable by an apparatus for correcting a present position of a movable body, such as a vehicle etc., onto a position on a route, where the movable body is supposed to exist, corresponding to the present position for use in a navigation system for navigating the movable body, tangibly embodying a program of instructions executable by the apparatus to perform method processes for correcting the present position of the movable body. The method processes are provided with: a vector generation process of generating a moving vector corresponding to a movement of the movable body with respect to a previously corrected position of the movable body as a start point of the moving vector; a display process of displaying a position of an end point of the generated moving vector as the present position of the movable body; and a correct process of correcting the position of the end point to a position on the route corresponding to the position of the end point after displaying the position of the end point by the display process.

According to the third program storage device, such as a CD-ROM, a ROM, a DVD, a floppy disk or the like, of the present invention, the above described third method of the present invention can be performed as the present position correcting apparatus reads and executes the program of instructions.

In one aspect of the third program storage device of the present invention, the method processes are further provided with a re-display process of displaying the corrected position on the route as the present position of the movable body.

According to this aspect of the third program storage device, the above described one aspect of the third method can be performed as the present position correcting apparatus reads and executes the program of instructions.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Referring to the accompanying drawings, embodiments of the present invention will be now explained. In the embodiment explained below, the explanation is made as for a case where the present invention is applied to an on-vehicle navigation apparatus for a vehicle or auto-mobile.

(I) Construction of Apparatus

At first, a whole construction of the on-vehicle navigation apparatus as the embodiment of the present invention is explained with reference to FIG. 1.

Figure 1:
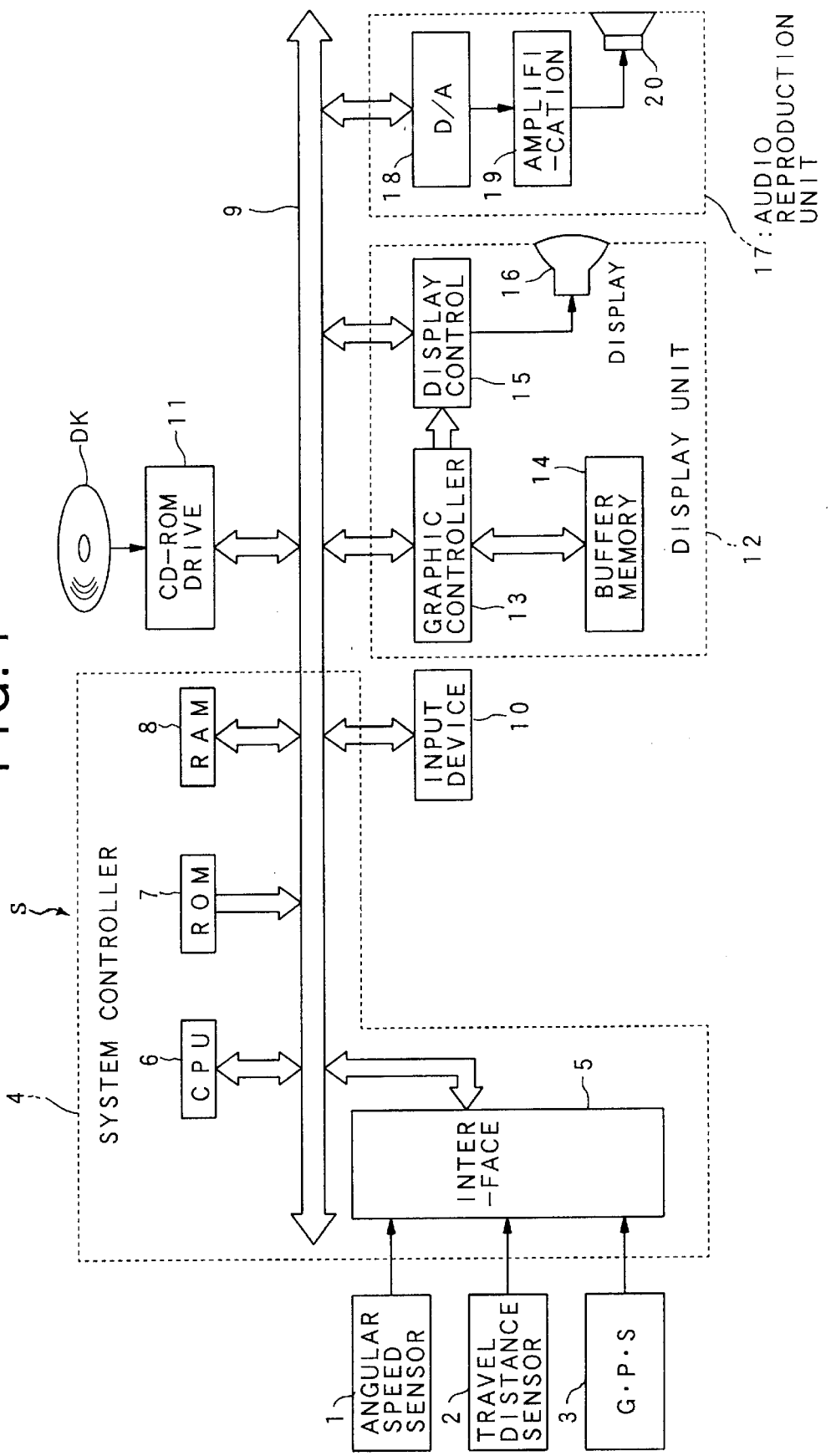
FIG. 1 is a block diagram of an on-vehicle navigation apparatus for use in embodiments of the present invention.

In FIG. 1, an on-vehicle navigation apparatus S is provided with: an angular speed sensor 1 for detecting an angular speed of a self vehicle at a time of turning or rotating, and outputting an angular speed data and a relative azimuth data; a travel distance sensor 2 for calculating the number of pulses per one rotation of a drive shaft by counting the number of pulses of a pulse signal having a predetermined cycle accompanying the rotation of the drive shaft, and for outputting travel distance data based on the number of pulses per one rotation of the drive shaft; a GPS receiver 3 for receiving electric waves from GPS satellites to output GPS measurement data, and for outputting absolute azimuth data of the advance direction of the self vehicle; a system controller 4 for performing an overall control of the navigation apparatus S on the basis of the relative azimuth data, the angular speed data, the travel distance data, the GPS measurement data and the absolute azimuth data; an input device 10 for inputting various data, such as an operation panel, a remote-control device or the like; a CD-ROM (Compact Disk-Read Only Memory) drive 11 for reading and outputting various data, such as map data including road data, which indicates the number of lanes, the width of the road etc., and control programs corresponding to respective embodiments described later from a CD-ROM disk DK, under the control of the system controller 4; a display unit 12 for displaying various display data under the control of the system controller 4; and an audio reproduction unit 17 for reproducing and outputting various audio data under the control of the system controller 4.

The system controller 4 is provided with: an interface portion 5 for executing an interface operation with external sensors e.g. the angular speed sensor 1, the travel distance sensor 2 and the GPS receiver 3; a CPU 6 for controlling the whole portion of the system controller 4; a ROM (Read Only Memory) 7 for storing a control program etc. to control the system controller 4; and a RAM (Random Access Memory) 8 having a non-volatile type memory for storing various data such as the route data set in advance by the user through the input device 10, in the random accessing manner. The input device 10, the CD-ROM drive 11, the display unit 12 and the audio reproduction unit reference 17 are all connected with the system controller 4 via a bus line 9.

The display unit 12 is provided with: a graphic controller 13 for performing an overall control of the display unit 12 on the basis of a control data transmitted from the CPU 6 through the bus line 9; a buffer memory 14 having a VRAM (Video RAM) etc., for temporarily storing the image information ready to be displayed; and a display control unit 15 for controlling a display 16 such as the LCD device, the CRT display device or the like, on the basis of the image data outputted from the graphic controller 13.

The audio reproduction unit 17 is provided with a D/A (Digital to Analog) converter 18 for performing a D/A conversion of audio digital data transmitted from the CD-ROM drive 11 or the RAY 8 through the bus line 9; an amplifier 19 for amplifying an audio analog signal from the D/A converter 18; and a speaker 20 for converting the amplified audio analog signal to the audio sound, and for outputting it to the external.

Nextly, the operation of the on-vehicle navigation apparatus S will be explained for each embodiment with reference to FIGS. 2 to 5C.

The operation indicated by the flow charts in the embodiments hereinbelow is mainly performed by the CPU 6, and is performed as one part of the main navigation program to perform the navigation operation by controlling the whole portion of the on-vehicle navigation apparatus S. Therefore, during the execution of the main navigation program, the operation indicated by the flow chart in each embodiment is constantly or continuously executed.

The program corresponding to the flow chart of each embodiment described below is stored in the CD-ROM disk DK as the control program in advance, and is read out therefrom through the CD-ROM drive 11 as the occasion demands.

In the present embodiment, the CD-ROM disk DK as one example of a program storage device, tangibly embodies a program of instructions executable by the system controller 4 to perform method processes for calculating a present position and/or correcting a present position as explained in detail with reference to the flow charts of FIGS. 2, 4 and 5A. The program read by the CD-ROM drive 11 may be stored in the RAY 8, so as to speedily execute the program. Alternatively, the program may be stored in the ROM 7 in advance, or may be received through a wire or wireless communication line by use of a modem and stored into the RAM 8.

(II) First Embodiment

Nextly, a time synchronization matching process of a first embodiment will be explained with reference to FIGS. 2 to 4.

In the on-vehicle navigation apparatus S of the present embodiment, among the GPS measurement data outputted from the GPS receiver 3, only the GPS measurement data outputted by the unit of "second" is used for the correction of the self-sustained measurement position, which is calculated on the basis of the relative azimuth data, the angular speed data and the travel distance data from each of the self-sustained type sensors (i.e. the angular speed sensor 1 and the travel distance sensor 2). Namely, for example, in case that the GPS measurement data is cyclically outputted, which corresponds to 1 second, 1.5 seconds and 2 seconds after a predetermined standard time (which is indicated by the unit of second), the GPS measurement data outputted 1.5 seconds after the standard time is not used for the correction. Further, the data from each of these self-sustained type sensors is taken into the CPU 6 once every second, and that the calculation for the self-sustained measurement position is performed once every second on the basis of the taken data.

In the time synchronization matching process of the first embodiment, the electric-wave-based measurement position is corrected on the basis of the time difference between the time, at which the electric-wave-based measurement position is calculated on the basis of the GPS measurement data, and the time, at which the self-sustained measurement position is calculated on the basis of the self-sustained type data, so that the corrected electric-wave-based measurement position is calculated, and that the self-sustained measurement position is corrected by use of the corrected electric-wave-based measurement position.

Figure 2:
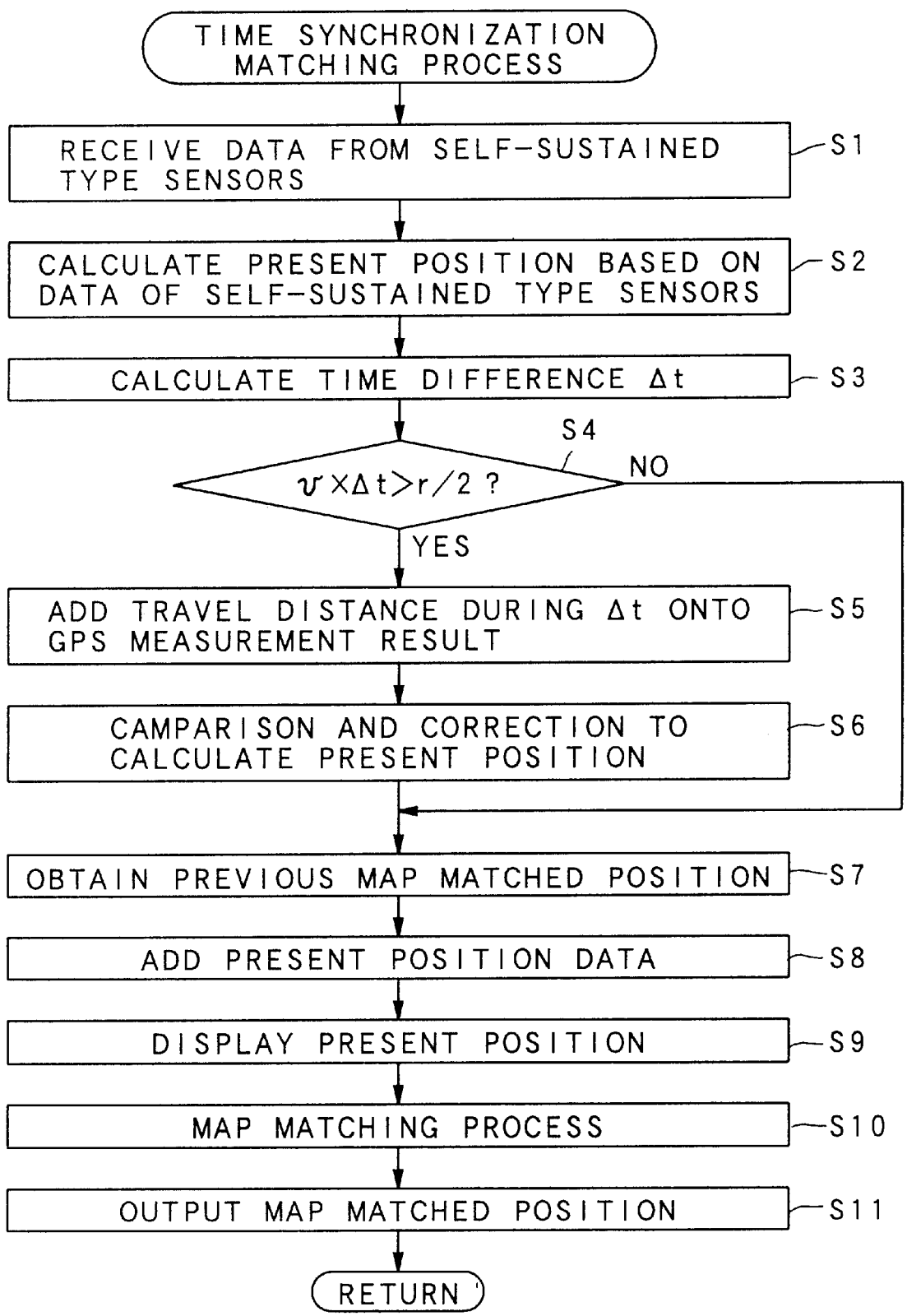
FIG. 2 is a flow chart showing a time synchronization matching process in a first embodiment of the present invention.

In case that the time synchronization matching process of the first embodiment shown in FIG. 2 is started as the routine called from the main navigation program, at first, the data from each of the self-sustained type sensors is received by the CPU 6 (step S1). At this time, the CPU 6 recognizes and stores the time, at which the CPU 6 receives each data (which is time-measured within the CPU 6 on the basis of a standard clock for the operation of the whole of the on-vehicle navigation apparatus S).

Nextly, on the basis of the data received at the step S1, the present position of the self vehicle is calculated in a self-sustained way. Namely, the self-sustained measurement position is calculated (step S2). Then, the receiving time, at which the data is received from the self-sustained type sensor recognized at the step S1, and the electric-wave-based measurement time, which is given to the latest GPS measurement data, are compared with each other. Then, the difference $\Delta t$ between these compared times is calculated (step S3).

Then, it is judged whether or not a product of the calculated time difference $\Delta t$ and a speed v of the self vehicle calculated on the basis of the data from the self-sustained type sensor (i.e. the distance for which the self vehicle has been traveled during the time difference $\Delta t$) is longer than a half of a radius r (i.e. r/2) of a GPS error circle R in the GPS measurement described later (step S4). Then, if the distance for which the self vehicle has been traveled during the time difference $\Delta t$ is longer than the half of the radius r of the GPS error circle R (step S4: YES), a correction process to achieve a time synchronization at and after a step S5 is performed. On the other hand, if the distance for which the self vehicle has been traveled during the time difference $\Delta t$ is not longer than the half of the radius r of the GPS error circle R (step S4: NO), the operation flow proceeds to a step S7 without performing the correction process to achieve the time synchronization.

Here, the GPS error circle R is explained. Namely, the measurement result based on the electric waves from the GPS satellites dedicated for positional measurement is generally outputted from the GPS receiver 3 as an area where the self vehicle may exist with a high probability. A circle indicating this area where the self vehicle may exist with the high probability (e.g. an area of $2\sigma$ in the normal distribution with respect to the position, where the probability of existence is the highest, as a center) is called as a GPS error circle R.

Therefore, the judgment at the step S4 is a judgment to execute the correction process to achieve the time synchronization at and after the step S5 only in case that the distance, for which the self vehicle has been traveled during the time difference $\Delta t$, is longer than the half of the radius r of the GPS error circle R, i.e., only in case that the error between the self-sustained measurement position based on the data from the self-sustained type sensors and the electric-wave-based measurement position based on the GPS measurement data is significantly large.

Figure 3A:
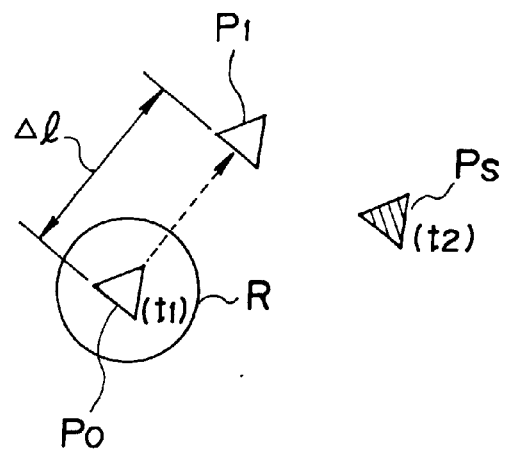
FIG. 3A is a diagram for explaining a process for calculating a corrected position measured by the measurement electric waves, in the time synchronization matching process of the first embodiment.

By the judgment at the step S4, if the distance for which the self-vehicle has been traveled during the time difference $\Delta t$ is longer than the half of the radius r of the GPS error circle R (step S4: YES), then, the corrected electric-wave-based measurement position after the correction is calculated by adding the travel distance during the time difference $\Delta t$, which is calculated on the basis of the data from the self-sustained type sensors, onto the electric-wave-based measurement position based on the GPS measurement data (step S5). In the process at the step S5, as shown in FIG. 3A, the electric-wave-based measurement position $P_0$, which is measured on the basis of the electric waves at a time $t_1$, is corrected forward by a distance $\Delta l$ for which the self vehicle has been traveled during the time difference $\Delta t$ between the time $t_1$ and a time $t_2$, at which the self-sustained measurement position Ps is calculated, so that the corrected electric-wave-based measurement position $P_1$ is calculated, for example.

Then, the positions of the corrected electric-wave-based measurement position P, and the self-sustained measurement position Ps are compared with each other, and the self-sustained measurement position Ps is corrected by use of the corrected electric-wave-based measurement value $P_1$, to calculate the present position of the self vehicle (step S6).

Next, a position on a road, which has been calculated by a previous map matching process (hereinbelow, which is referred to as a "previously map matched position") is obtained from the RAY 8 (step S7). The present position of the self vehicle calculated at the step S6 is added to the previous map matched position as a moving vector (step S8), and the present position of the self vehicle is displayed as a present position mark of the self vehicle on the display 16 (step S9). After that, the map matching process is performed with respect to the present position of the self vehicle (step S10), and the present position mark is re-displayed to be positioned as a map matched position on a road or the like, where the self vehicle should actually exist on the display 16. Then, the operation flow returns to the main navigation program.

Figure 3B:
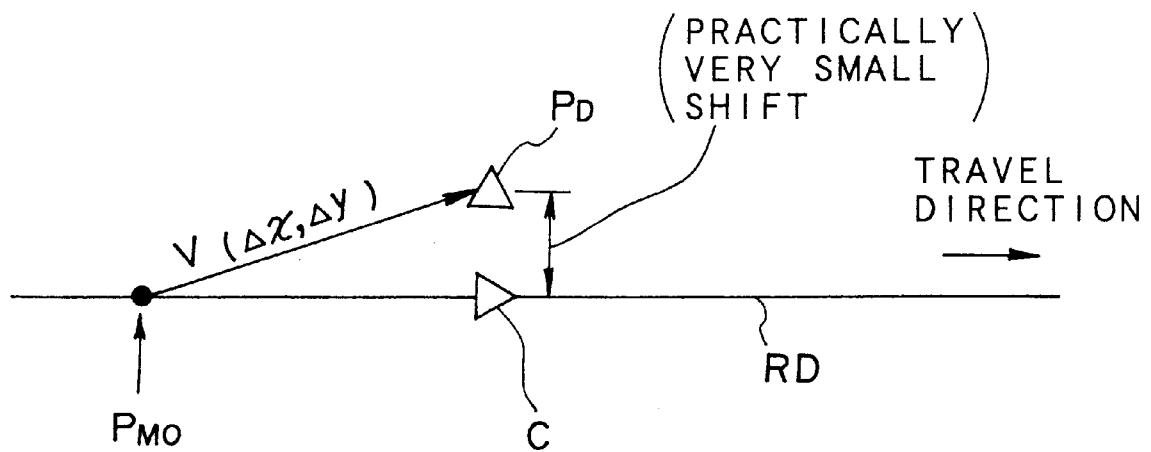
FIG. 3B is a diagram for explaining a map matching process after displaying, in the time synchronization matching process of the first embodiment.

Among the processes shown in FIG. 2, the processes from the step S7 to the step S9 are explained in more detail with reference to FIG. 3B. As shown in FIG. 3B, the present position of the self vehicle on the display 16 (which corresponds to a position $P_D$ in FIG. 3B), which is obtained in a case where the present position of the self vehicle calculated at the step S6 is added as the moving vector V ($\Delta x$, $\Delta y$) onto the previous map matched position $P_{MO}$, may be shifted from a road RD, on which the self vehicle should actually exist, at the stage of the step S7 since the map matching process has not been performed yet at this stage. However, in this case, the shift from the road RD is equivalent to a shift of the present position of the self vehicle calculated at the step S6 on the basis of the self-sustained measurement position, which is calculated from the data from the self-sustained type sensors once every second. That is to say, this shift is supposed to be within the range for which the self vehicle travels in just one second. Therefore, this shift is so small that the present position $P_D$ cannot be differentiated on the actual display 16 from a true present position C where the self vehicle is actually positioned on the road RD, due to the accuracy of the self-sustained type sensors or the like. For this reason, in the present embodiment, at the stage that the present position of the self vehicle is calculated in accompaniment with the calculation of the moving vector V, the pertinent present position of the self vehicle is displayed as the present position mark on the display 16 (step S9), and, after that, the map matching process is performed (step S10), so that the display position of the present position mark on the display 16 is corrected and the standard point for the calculation of the moving vector V for the next timing is calculated (step S11).

Incidentally, in the process at the step S11 of FIG. 2, after the map matching process is performed with respect to the present position of the self vehicle displayed at the step S9 (step S10), the present position mark is corrected to be the map matched position on the road where the self vehicle should be actually exist on the display 16. However, it is not limited to this. For example, the present embodiment may be constructed such that, after the map matching process is performed at the step S10, only the process of obtaining the standard point for the calculation of the moving vector V at the next timing is performed without displaying the map matched position.

As explained above in detail, according to the time synchronization matching process of the first embodiment, the time difference $\Delta t$ between the time for the electric-wave-based measurement and the time at receiving the data from the self-sustained type sensors is calculated. Then, the corrected electric-wave-based measurement position is obtained by correcting the electric-wave-based measurement position i.e., the present position measured on the basis of only the GPS measurement data, on the basis of the calculated time difference $\Delta t$. Then, the present position of the self vehicle is calculated by correcting the self-sustained measurement position i.e., the present position measured on the basis of only the data from the self-sustained type sensors, by use of the corrected electric-wave-based measurement position. Accordingly, even in case that there is a considerably large time difference between the time for the electric-wave-based measurement and the time at receiving the data from the self-sustained type sensors, by correcting it to calculate the present position, the accurate present position in consideration of the time difference can be calculated.

Since the corrected electric-wave-based measurement position is calculated by superimposing the moving distance $\Delta l$, which corresponds to the time difference $\Delta t$ of the self vehicle calculated on the basis of the data from the self-sustained type sensors, onto the electric-wave-based measurement position, the accurate present position can be calculated by use of a relatively simple process.

Further, after the present position is displayed, which is obtained by correcting the present position based on the data from the self-sustained type sensors by use of the corrected electric-wave-based measurement position, the displayed present position is corrected by use of the map matching process onto the road RD. Therefore, as compared with a case where the present position is displayed after executing the map matching process for correcting the present position onto the road RD, the present position can be displayed without including a moving error due to the time required for the map matching process according to the present embodiment.

In the first embodiment shown in FIG. 2, at the step S4, the correction process to achieve the time synchronization is executed only when the distance for which the self vehicle has been traveled during the time difference $\Delta t$ is longer than the half of the radius r of the GPS error circle R. However, it is not limited to this. For example, as shown in FIG. 4, which is a flow chart of a time synchronization matching process in a modified embodiment of the first embodiment, the time synchronization matching process same as the first embodiment may be executed when each of predetermined conditions as for the speed v of the self vehicle, the radius r of the GPS error circle R and the time difference $\Delta t$ is satisfied independently. In FIG. 4, the same steps as those in FIG. 2 carry the same step numbers and the explanations thereof are omitted.

Figure 4:
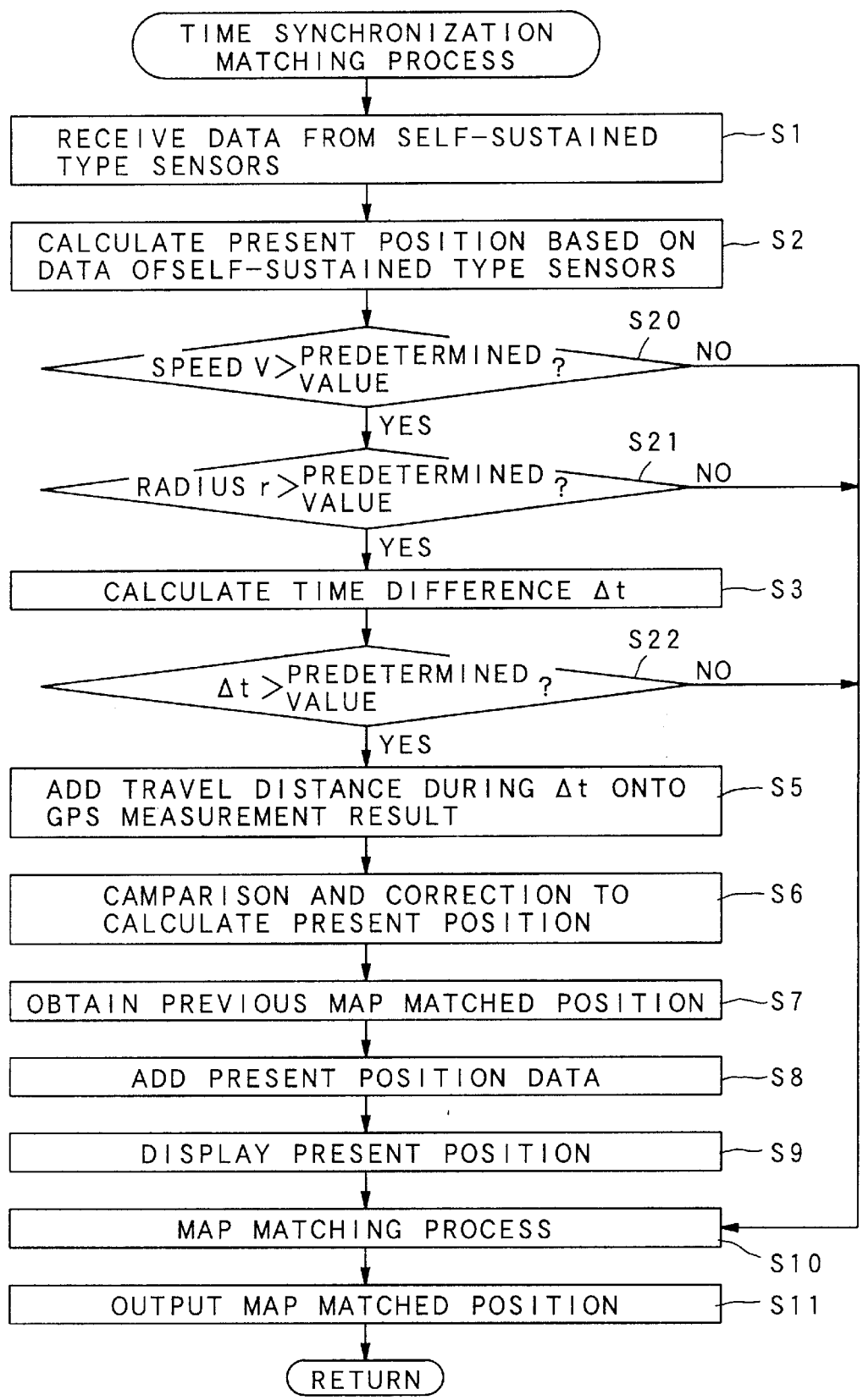
FIG. 4 is a flow chart showing a time synchronization matching process in a modified embodiment.

More concretely, as shown in FIG. 4, after the processes at the steps S1 and S2 are completed, if the speed v of the self vehicle is higher than a predetermined speed value (step S20: YES), and if the radius r of the GPS error circle R is shorter than a predetermined length value (step S21: YES), the time difference $\Delta t$ is calculated (step S3). After that, if the calculated time difference $\Delta t$ is longer than a predetermined time value (step S22: YES), the correction process to achieve the time synchronization at and after the step S5 is performed. At this time, as one example of the predetermined speed value as a threshold for the speed v of the self vehicle at the step S20, 60 km/h may be adopted. As one example of the predetermined length value as a threshold for the radius r of the GPS error circle R at the step S21, 50 m may be adopted. As one example of the predetermined time value as a threshold for the time difference $\Delta t$ at the step S22, 3 seconds may be adopted.

(III) Second Embodiment

Nextly, a distance data interpolation process in a second embodiment of the present invention will be explained with reference to FIGS. 5A to 5C.

Figure 5A:
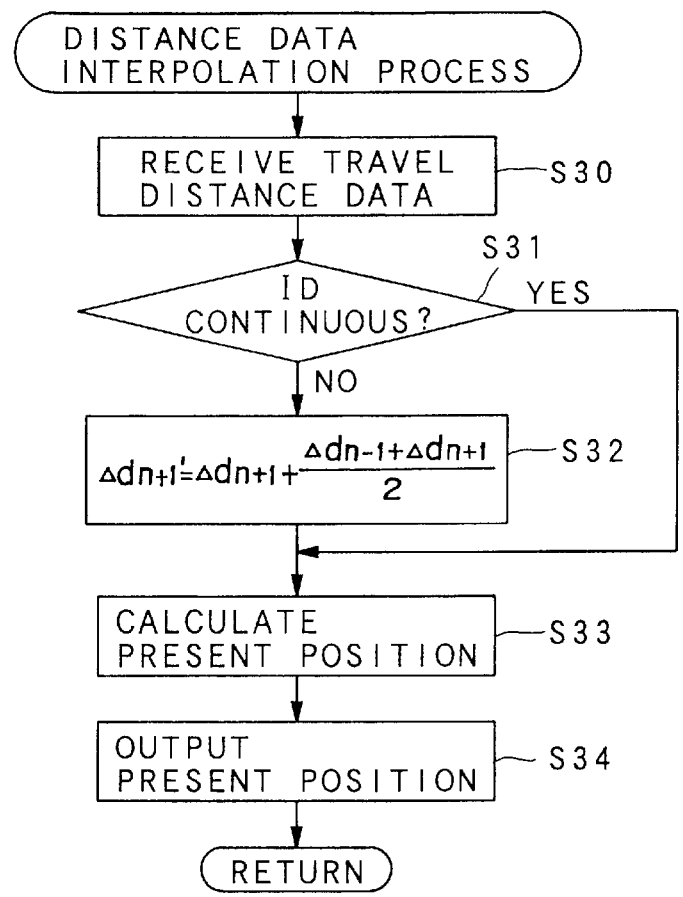
FIG. 5A is a flow chart showing a distance data interpolation process in a second embodiment of the present invention.
Figure 5B:
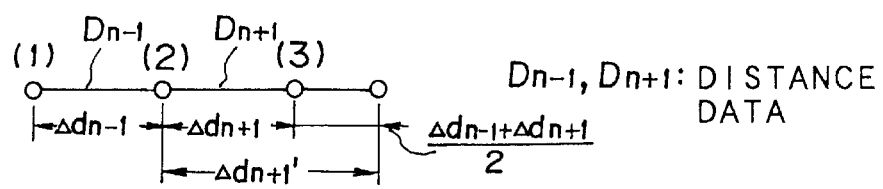
FIG. 5B is a diagram for explaining the distance data interpolation process in the second embodiment.
Figure 5C:
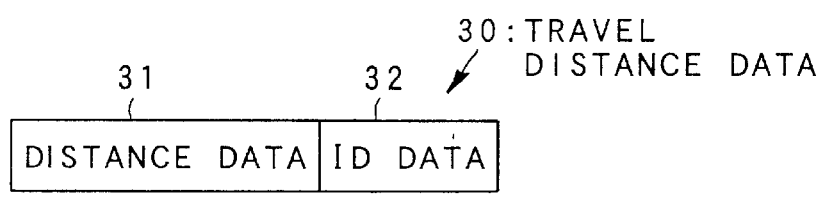
FIG. 5C is a diagram showing a data structure of travel distance data for use in the distance data interpolation process of the second embodiment.
Figure 6A:
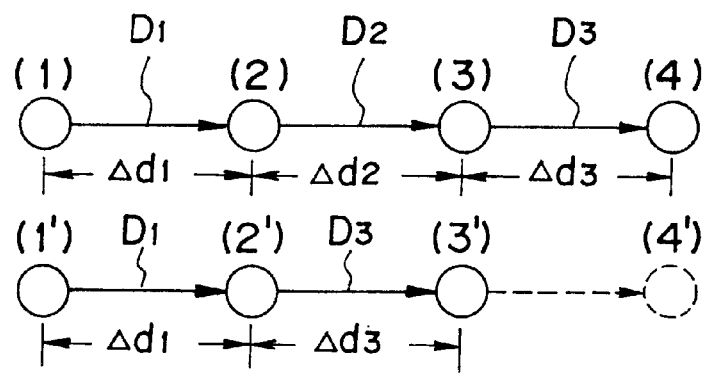
FIG. 6A is a diagram for explaining a problem in case that travel distance data is dropped in the related art.
Figure 6B:
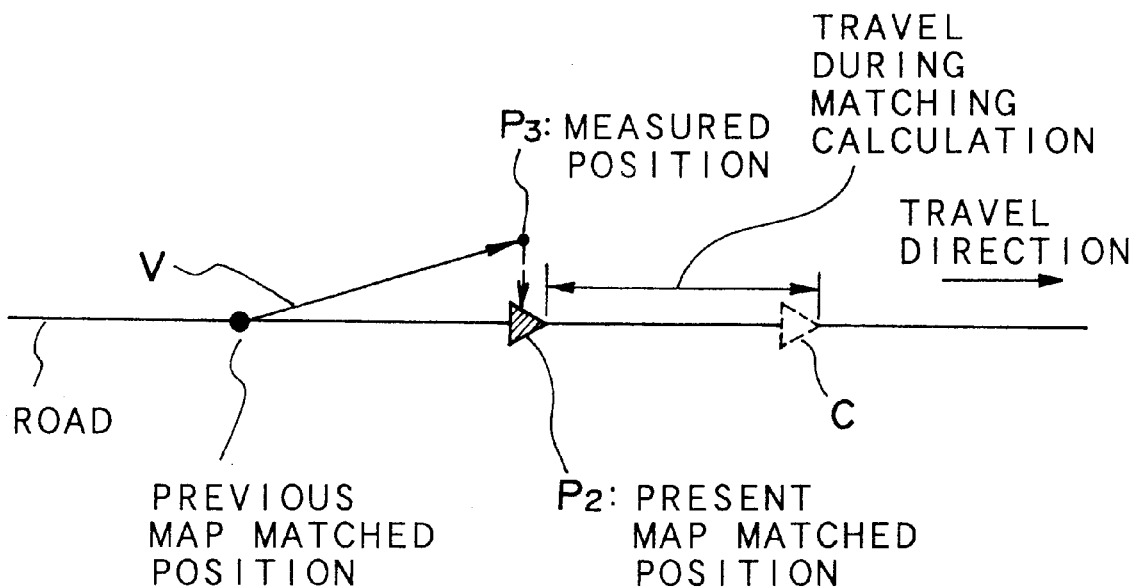
FIG. 6B is a diagram for explaining a problem due to a time period required for a map matching process in the related art.

In the on-vehicle navigation apparatus S of the present embodiment, in travel distance data 30 outputted at each cycle from the travel distance sensor 2 among the self-sustained type sensors, distance data 31 as substantial data of the travel distance data 30, and ID data 32 as identification data to identify the travel distance data 30 at each cycle are included as shown in FIG. 5C. Here more concretely, one number among numbers from "0" to "255" is written in each ID data 32 in case that the ID data 32 is constructed as 1 byte data, for example. And that, each of one travel distance data 30 and another travel distance data 30 continuous to it has the ID data 32 in which a number continuous to each other is written.

By this, in the distance data interpolation process of the second embodiment, a drop-out of the travel distance data 30 is detected by monitoring the ID data 32. In case that the drop out is detected, a process for interpolating the dropped out travel distance data 30 is executed by use of another pieces of the travel distance data 30 before and after the dropped out travel distance data 30.

In case that the distance data interpolation process of the second embodiment shown in FIG. 5A is started as the routine called from the main navigation program, at first, the travel distance data 30 from the travel distance sensor 2 is received by the CPU 6 (step S30).

Then, the monitoring process for the ID data 32 of each travel distance data 30 is started, so that it is judged whether or not the ID data 32 of the presently received travel distance data 30 is continuous to that of the previously received travel distance data 30, which is supposed to be continuous in a normal situation (step S31). Then, if the ID data is judged to be continuous (step S31: YES), the distance data 31 in the received travel distance data 30 is accumulated as it is, so that the travel distance is calculated and the present position is calculated (step S33). After that, the calculated present position is outputted to the display unit 12 or the like (step S34), and the operation flow returns to the main navigation program.

On the other hand, by the judgment at the step S31, if the drop out of the travel distance data 30 is detected on the basis of the ID data 32 i.e., the ID data 32 is not continuous (step S31: NO), the process for interpolating the dropped out travel distance data 30 is performed by use of two pieces of the travel distance data 30 which are received before and after the dropped out travel distance data 30 (step S32).

Next, the interpolating process at the step S32 is explained with reference to FIG. 5B, showing a case where just one travel distance data 30 is dropped out. In FIG. 5B, it is assumed that the distance data 31 of the travel distance data 30 before the dropped out travel distance data 30 is distance data Dn−1, and that the distance data 31 of the travel distance data 30 after the dropped out travel distance data 30 is distance data Dn+1. In case that just one travel distance data 30 is dropped out, the distance $\Delta$dn−1 indicated by the distance data Dn−1 and the distance $\Delta$dn+1 indicated by the distance data Dn+1 are added together. Thus, at the step S31, if the drop out of the travel distance data 30 is detected on the basis of the discontinuity of the ID data 32 (step S31: NO), at first the distance $\Delta$dn−1 indicated by the distance data Dn−1 and the distance $\Delta$dn+1 indicated by the distance data Dn+1 are added together. Then, the average of distance $\Delta$dn−1 and the distance $\Delta$dn+1 [ i.e., ($\Delta$dn−1+$\Delta$dn+1)/2] is calculated, and is added to the distance $\Delta$dn+1, so that the interpolated distance $\Delta$dn+1' is calculated (step S32). Namely, this interpolated distance $\Delta$dn+1' indicates the distance in consideration of the distance indicated by the distance data 31 included in the dropped out travel distance data 30.

After that, the distance data 31 of the subsequent travel distance data 30 is accumulated with respect to this interpolated distance $\Delta$dn+1', so that the travel distance is calculated and the present position is calculated (step S33). Then, this calculated present position is outputted to the display unit 12 or the like (step S34), and the operation flow returns to the main navigation program.

As described above in detail, according to the distance data interpolation process of the second embodiment, the drop out of the travel distance data 30 is detected on the basis of the ID data 32 of the outputted travel distance data 30. When the drop out is detected, the average of the distances indicated by two pieces of the travel distance data 30 outputted before and after the dropped out travel distance data 30 is calculated, so as to interpolate the distance indicated by the distance data 31 included in the dropped out travel distance data 30 on the basis of the two pieces of the travel distance data 30 outputted before and after the dropped out travel distance data 30, and the travel distance is calculate by use of the calculated average distance. Thus, even if the travel distance data 30 to be continuously outputted is dropped out at one timing, the travel distance can be calculated by approximately interpolating it by the average distance, and the accurate present position of the self vehicle can be calculated.

In the second embodiment, the case where just one travel distance data 30 is dropped out has been explained. However, it is not limited to this. Namely, even in case that a plurality pieces of travel distance data 30 are dropped out at different timings, the present invention can be adapted. For example, in case that three consecutive pieces of the travel distance data 30 are dropped out, the average of the distances indicated by two pieces of the distance data 31 included in two pieces of the travel distance data 30 before and after the dropped out travel distance data 30 is calculated, and the calculated average is multiplied by 3 and then is accumulated, so that the dropped out travel distance data 30 can be approximately interpolated.

Furthermore, the dropped out travel distance data 30 may be interpolated even more accurately, by differentiating the distance indicated by the distance data 31 included in the travel distance data 30 within a predetermine range before and after the dropped out travel distance data 30, by recognizing the tendency of the distance change of the travel distance data 30 before and after the dropped out, and by calculating the distance for interpolation in line with this recognized tendency.

Although the case where the movable body is the vehicle or auto-mobile is explained in the above embodiment, the present invention is not limited to this. Instead, the present invention can be adapted for other types of movable bodies such as an auto-cycle, auto-tricycle and so on.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method of calculating a present position of a movable body for use in a navigation system for navigating said movable body, said method comprising:

an electric-wave-based measurement process of measuring an electric-wave-based measurement position which is a position of said movable body measured on the basis of electric waves for positional measurement, which are transmitted from satellites, and which include time data indicating an electric-wave-based measurement time which is a time when measuring the electric-wave-based measurement position, at the electric-wave-based measurement time;

a self-sustained measurement process of measuring a self-sustained measurement position which is a position of said movable body measured on the basis of data from self-sustained type sensors built in said movable body;

a time difference calculation process of calculating a time difference between a time when measuring the electric-wave-based measurement position by said electric-wave-based measurement process and a time when measuring the self-sustained measurement position by said self-sustained measurement process;

a correction process of correcting the electric-wave-based measurement position on the basis of the calculated time difference; and a present position calculation process of calculating the present position of said movable body on the basis of the corrected electric-wave-based measurement position and the self-sustained measurement position.

2. A method according to claim 1, wherein said correction process corrects the electric-wave-based measurement position by superimposing a moving distance of said movable body, which corresponds to the calculated time difference and is calculated on the basis of the data from said self-sustained type sensors, onto the electric-wave-based measurement position, so as to calculate the corrected electric-wave-based measurement position.

3. A method of calculating a present position of a movable body for use in a navigation system having a distance sensor for navigating said movable body, said distance sensor cyclically outputting distance data, which indicates a moving distance of said movable body measured in a self-sustained way once every predetermined cycle and includes an identifier for identifying the distance data at each cycle, said method comprising:

a distance measurement process of outputting the distance data one after another in connection with a movement of said movable body;

a drop out detection process of detecting a drop out of the distance data on the basis of said identifier included in the outputted distance data;

a pseudo distance data generation process of generating pseudo distance data corresponding to the dropped out distance data on the basis of the distance data outputted before the dropped out distance data and the distance data outputted after the dropped out distance data, when the drop out is detected by said drop out detection process;

a moving distance calculation process of calculating the moving distance by adding the generated pseudo distance data onto the distance data outputted after the dropped out distance data, when the drop out is detected by said drop out detection process; and a present position calculation process of calculating the present position of said movable body on the basis of the calculated moving distance.

4. A method of correcting a present position of a movable body onto a position on a route, where said movable body is supposed to exist, corresponding to the present position for use in a navigation system for navigating said movable body, said method comprising:

a vector generation process of generating a moving vector corresponding to a movement of said movable body with respect to a previously corrected position of said movable body as a start point of said moving vector;

a display process of displaying a position of an end point of the generated moving vector as the present position of said movable body; and a correct process of correcting the position of the end point to a position on the route corresponding to the position of the end point after displaying the position of the end point by said display process.

5. A method according to claim 4, further comprising a redisplay process of displaying the corrected position on the route as the present position of said movable body.

6. An apparatus for calculating a present position of a movable body for use in a navigation system for navigating said movable body, said apparatus comprising:

an electric-wave-based measurement means for measuring an electric-wave-based measurement position which is a position of said movable body measured on the basis of electric waves for positional measurement, which are transmitted from satellites, and which include time data indicating an electric-wave-based measurement time which is a time when measuring the electric-wave-based measurement position, at the electric-wave-based measurement time;

a self-sustained measurement means for measuring a self-sustained measurement position which is a position of said movable body measured on the basis of data from self-sustained type sensors built in said movable body;

a time difference calculation means for calculating a time difference between a time when measuring the electric-wave-based measurement position by said electric-wave-based measurement means and a time when measuring the self-sustained measurement position by said self-sustained measurement means;

a correction means for correcting the electric-wave-based measurement position on the basis of the calculated time difference; and a present position calculation means for calculating the present position of said movable body on the basis of the corrected electric-wave-based measurement position and the self-sustained measurement position.

7. An apparatus according to claim 6, wherein said correction means corrects the electric-wave-based measurement position by superimposing a moving distance of said movable body, which corresponds to the calculated time difference and is calculated on the basis of the data from said self-sustained type sensors, onto the electric-wave-based measurement position, so as to calculate the corrected electric-wave-based measurement position.

8. An apparatus for calculating a present position of a movable body for use in a navigation system having a distance sensor for with navigating said movable body, said distance sensor cyclically outputting distance data, which indicates a moving distance of said movable body measured in a self-sustained way once every predetermined cycle and includes an identifier for identifying the distance data at each cycle, said apparatus comprising:

a distance measurement means for outputting the distance data one after another in connection with a movement of said movable body;

a drop out detection means for detecting a drop out of the distance data on the basis of said identifier included in the outputted distance data;

a pseudo distance data generation means for generating pseudo distance data corresponding to the dropped out distance data on the basis of the distance data outputted before the dropped out distance data and the distance data outputted after the dropped out distance data, when the drop out is detected by said drop out detection means;

a moving distance calculation means for calculating the moving distance by adding the generated pseudo distance data onto the distance data outputted after the dropped out distance data, when the drop out is detected by said drop out detection means; and a present position calculation means for calculating the present position of said movable body on the basis of the calculated moving distance.

9. An apparatus for correcting a present position of a movable body onto a position on a route, where said movable body is supposed to exist, corresponding to the present position for use in a navigation system for navigating said movable body, said apparatus comprising:

a vector generation means for generating a moving vector corresponding to a movement of said movable body with respect to a previously corrected position of said movable body as a start point of said moving vector;

a display means for displaying a position of an end point of the generated moving vector as the present position of said movable body; and a correct means for correcting the position of the end point to a position on the route corresponding to the position of the end point after displaying the position of the end point by said display means.

10. An apparatus according to claim 9, wherein said display means displays the corrected position on the route as the present position of said movable body.

11. A program storage device readable by an apparatus for calculating a present position of a movable body for use in a navigation system for navigating said movable body, tangibly embodying a program of instructions executable by said apparatus to perform method processes for calculating the present position of said movable body, said method processes comprising:

an electric-wave-based measurement process of measuring an electric-wave-based measurement position which is a position of said movable body measured on the basis of electric waves for positional measurement, which are transmitted from satellites, and which include time data indicating an electric-wave-based measurement time which is a time when measuring the electric-wave-based measurement position, at the electric-wave-based measurement time;

a self-sustained measurement process of measuring a self-sustained measurement position which is a position of said movable body measured on the basis of data from self-sustained type sensors built in said movable body;

a time difference calculation process of calculating a time difference between a time when measuring the electric-wave-based measurement position by said electric-wave-based measurement process and a time when measuring the self-sustained measurement position by said self-sustained measurement process;

a correction process of correcting the electric-wave-based measurement position on the basis of the calculated time difference; and a present position calculation process of calculating the present position of said movable body on the basis of the corrected electric-wave-based measurement position and the self-sustained measurement position.

12. A program storage device according to claim 11, wherein said correction process corrects the electric-wave-based measurement position by superimposing a moving distance of said movable body, which corresponds to the calculated time difference and is calculated on the basis of the data from said self-sustained type sensors, onto the electric-wave-based measurement position, so as to calculate the corrected electric-wave-based measurement position.

13. A program storage device readable by an apparatus for calculating a present position of a movable body for use in a navigation system having a distance sensor for navigating said movable body, said distance sensor cyclically outputting distance data, which indicates a moving distance of said movable body measured in a self-sustained way once every predetermined cycle and includes an identifier for identifying the distance data at each cycle, tangibly embodying a program of instructions executable by said apparatus to perform method processes for calculating the present position of said movable body, said method processes comprising:

a distance measurement process of outputting the distance data one after another in connection with a movement of said movable body;

a drop out detection process of detecting a drop out of the distance data on the basis of said identifier included in the outputted distance data;

a pseudo distance data generation process of generating pseudo distance data corresponding to the dropped out distance data on the basis of the distance data outputted before the dropped out distance data and the distance data outputted after the dropped out distance data, when the drop out is detected by said drop out detection process;

a moving distance calculation process of calculating the moving distance by adding the generated pseudo distance data onto the distance data outputted after the dropped out distance data, when the drop out is detected by said drop out detection process; and a present position calculation process of calculating the present position of said movable body on the basis of the calculated moving distance.

14. A program storage device readable by an apparatus for correcting a present position of a movable body onto a position on a route, where said movable body is supposed to exist, corresponding to the present position for use in a navigation system for navigating said movable body, tangibly embodying a program of instructions executable by said apparatus to perform method processes for correcting the present position of said movable body, said method processes comprising:

a vector generation process of generating a moving vector corresponding to a movement of said movable body with respect to a previously corrected position of said movable body as a start point of said moving vector;

a display process of displaying a position of an end point of the generated moving vector as the present position of said movable body; and a correct process of correcting the position of the end point to a position on the route corresponding to the position of the end point after displaying the position of the end point by said display process.

15. A program storage device according to claim 14, wherein said method processes further comprise a re-display process of displaying the corrected position on the route as the present position of said movable body.

* * * * *